United States Patent
Muhammad (10) Patent No.: US 8,682,395 B2
(45) Date of Patent: Mar. 25, 2014

(54) COMMUNICATIONS DEVICE AND METHOD HAVING NON-TOUCH BASED INPUT SCREEN

(75) Inventor: Khurram Muhammad, Garland, TX (US)

(73) Assignee: BlackBerry Limited, Waterloo, Ontario (CA)

( * ) Notice: Subject to any disclaimer, the term of this patent is extended or adjusted under 35 U.S.C. 154(b) by 28 days.

(21) Appl. No.: 13/359,889

(22) Filed: Jan. 27, 2012

(65) Prior Publication Data

US 2013/0196716 A1 Aug. 1, 2013

(51) Int. Cl.
*H04M 1/00* (2006.01)

(52) U.S. Cl.
USPC .......... 455/566; 455/550.1; 455/556.2; 345/177; 345/173; 345/175

(58) Field of Classification Search
USPC ........... 455/566, 550.1, 556.2; 345/177, 175, 345/173
See application file for complete search history.

(56) References Cited

U.S. PATENT DOCUMENTS

| | | | | |
|---|---|---|---|---|
| 6,121,960 A * | 9/2000 | Carroll et al. | | 345/173 |
| 6,209,104 B1 * | 3/2001 | Jalili | | 726/18 |
| 2009/0258660 A1 * | 10/2009 | Bush et al. | | 455/456.5 |
| 2010/0253536 A1 * | 10/2010 | Shionozaki | | 340/825.49 |
| 2012/0078502 A1 * | 3/2012 | Bolin | | 701/409 |
| 2012/0264460 A1 * | 10/2012 | Bush et al. | | 455/457 |
| 2013/0127783 A1 * | 5/2013 | Lee | | 345/175 |

OTHER PUBLICATIONS

"*Welcome to the Worldwide Interne Distributor of the Virtual Laswer Keyboard the 'Magic Cube'*" www.viual-laswer-devices.com Printed Dec. 1, 2011.

"*FMCW Radar Sensors: Advantages and disadvantages of FMCW radar*" www.siversima.com, Jun. 2011.

"*FMCW*" http://en.wikipedia.org/wiki/FMCW Printed Jan. 26, 2012.

"*Global Positioning System*" http://en.wikipeida.org./wiki/Global_Positioning_System Printed Jan. 26, 2012.

* cited by examiner

*Primary Examiner* — Khai M Nguyen (74) *Attorney, Agent, or Firm* — Allen, Dyer, Doppelt, Milbrath & Gilchrist, P.A.

(57) ABSTRACT

A communications device includes a housing and a wireless transceiver and processor carried by the housing and operative with each other. An input screen is carried by the housing and comprises a plurality of spaced transceivers positioned at the input screen and connected to the processor and each configured to transmit a millimeter wave RF signal and receive reflected signals from an object positioned close to the input screen. The processor is configured to determine the location of the object relative to the input screen based on the reflected signals received at each transceiver.

21 Claims, 7 Drawing Sheets

| PHY MODE | HRP FR | HRP FR | HRP HR | MRP HR | HRP HR | MRP QR | MRP QR |
|---|---|---|---|---|---|---|---|
| PHY RATE (Gbps) | 3.8 | 3.8 | 1.9 | 1.0 | 1.9 | 0.5 | 0.5 |
| NUM ANTENNAS (@ 12dBm) | 2 | 4 | 2 | 2 | 4 | 2 | 4 |
| TOTAL GEN3 RF CHIP POWER | 368 | 502 | 380 | 400 | 527 | 400 | 568 |
| MAX RF POWER (MODULE) | 498 | 680 | 515 | 542 | 713 | 542 | 769 |
| MAX BB POWER (MODULE) | 1445 | 1445 | 1445 | 952 | 1445 | 952 | 952 |
| TOTAL PEAK POWER (MODULE) | 1943 | 2125 | 1960 | 1494 | 2158 | 1494 | 1721 |
| AVERAGE 0.25 GB/s POWER | | | | 597 | | 896 | 1033 |
| AVERAGE 0.5 GB/s POWER | | | 784 | 896 | 863 | 1494 | 1721 |
| AVERAGE 1.0 GB/s POWER | 777 | 850 | 1176 | 1494 | 1295 | | |
| APPROX LOS RANGE (m) | 0.6 | 1.3 | 2.5 | 3.7 | 5.0 | 9.5 | 19.0 |
| APPROX NLOS RANGE (m) | 0.2 | 0.4 | 0.8 | 1.2 | 1.6 | 3.0 | 6.0 |

SILICON VENDOR "A" MEASURED PERFORMANCE FOR MOBILE USE CASE SCENARIOS.

COMMUNICATIONS DEVICE AND METHOD HAVING NON-TOUCH BASED INPUT SCREEN

TECHNICAL FIELD

This application relates to the field of communications, and more particularly, to mobile wireless communications devices that include an input screen.

BACKGROUND

Mobile communication systems continue to grow in popularity and have become an integral part of both personal and business communications. Various mobile devices now incorporate Personal Digital Assistant (PDA) features such as calendars, address books, task lists, calculators, memo and writing programs, media players, games, etc. These multi-function devices usually allow users to send and receive electronic mail (email) messages wirelessly and access the internet via a cellular network and/or a wireless local area network (WLAN), for example.

Handheld electronic devices may have a number of different configurations. Examples of such devices include personal data assistants ("PDAs"), handheld computers, two-way pagers, cellular telephones, and the like. Many handheld electronic devices also feature wireless communication capability, although many other handheld electronic devices are stand-alone devices that are functional without communication with other devices.

Handheld electronic devices are generally intended to be portable, and thus, are typically a relatively compact configuration in which keys and other input structures often perform multiple functions under certain circumstances or may otherwise have multiple aspects or features assigned thereto.

In addition to using keys on a keypad, handheld electronic devices may also use a touch screen. A touch screen is typically a display screen overlay which provides the ability to display and receive information on the same display screen. The effect of the overlay is to allow a display screen to be used as an input device, removing the keys on the keypad as the primary input device for interacting with the display screen's content. Display screens with integrated touch screens can make computers and handheld electronic devices more useable. A touch screen or touch screen system typically includes a touch sensor, a controller or processor, and accompanying software. The controller communicates user selections to the processor of the electronic device in which the touch screen is used. The controller and processor can be separate or the same device.

Although touch screens are advantageous, it would be more advantageous to enhance a user experience where a display screen would not require touch activation and a non-touch based input device could be provided to enhance the user experience in the application space by computing the location of an object close to the screen and report the x, y, z coordinates to an application program used by the mobile wireless communications device and require determination of position. This could enhance a user's experience such as with a keyboard that is displayed by the input screen and act as a virtual three-dimensional keyboard in which the user maneuvers a stylus or other object (perhaps even his or her finger) in a typing movement and the input screen would know the object's location relative to the virtual or 3D keyboard and allow typing from those different location coordinates.

BRIEF DESCRIPTION OF THE DRAWINGS

Other objects, features and advantages of the present invention will become apparent from the detailed description of the invention which follows, when considered in light of the accompanying drawings in which.

DETAILED DESCRIPTION

Different embodiments will now be described more fully hereinafter with reference to the accompanying drawings, in which various embodiments are shown. Many different forms can be set forth and described embodiments should not be construed as limited to the embodiments set forth herein. Rather, these embodiments are provided so that this disclosure will be thorough and complete, and will fully convey the scope to those skilled in the art. Like numbers refer to like elements throughout.

A communications device includes a housing and a wireless transceiver and processor carried by the housing and operative with each other. An input screen is carried by the housing and comprises a plurality of spaced transceivers positioned at the input screen and connected to the processor and each configured to transmit a millimeter wave RF signal and receive reflected signals from an object positioned close to the input screen. The processor is configured to determine the location of the object relative to the input screen based on the reflected signals received at each transceiver.

In one example, each transceiver includes an oscillator and embedded antenna wherein the oscillator is configured to sweep an output frequency and reflected signals are received at a frequency lag producing an intermediate frequency (IF) signal. The processor is configured to determine the location of the object relative to the input screen based on the reflected signals at each transceiver. The offset of the IF frequency represents the distance of the object that reflected the signals.

The strength of the received signal depends on the reflectivity as the dielectric constant of the object that reflects the signals. Each transceiver can include a diode connected to the oscillator and operative together to down-convert the received signals using the transmitted signal as a local oscillator.

In another example, the input screen is formed as a display and includes an application program operating within the processor to which the location of the object is used by the application program as an input. This application program is operative to function as a keyboard displayed on the input screen wherein the location of the object relative to the keyboard displayed on the screen is an input for a typed keyboard entry.

In another example, each transceiver is configured to transmit about 60 GHz RF signals within a several hundred MHz tuning range. Each transmitted RF signal includes a frequency modulated continuous-wave radar signal. Each transceiver is configured to transmit the RF signal at a different frequency and detected intermediate frequencies are processed to determine the object's location. RF signals from the transceivers can be formed as multi-phased ramp signals.

In another example, the input screen is a substantially rectangular configured input screen. A transceiver is spaced at each corner of the rectangular configured input screen and an embedded antenna is positioned at each transceiver. A method aspect is also set forth.

In accordance with a non-limiting example, a non-touch based input device is based on millimeter wave radio frequency signals and enhances a user experience in the application space by computing the location of an object close to the input screen, such as the display using frequency modulated continuous-wave radar in one example. A processor determines the x, y, z coordinates of the object to which the signals are reflected for a device application requiring determination of the position, for example, for a three-dimensional keyboard function. Thus, it is possible to detect the location of a reflector in three-dimensional space by using three or more "stations" as spaced transceivers around the input screen such as located at each corner of the rectangular configured input screen.

The 60 GHz frequency band sees a first use for applications that are defined in 2.4 GHz and 5 GHz bands. The physics of 60 GHz are different from the physics of these lower frequency bands. The 60 GHz signals have a narrower beam and attenuate faster and have a shorter range due to more wavelengths traversing the same distance. These could be seen as disadvantages of going to the higher frequencies, but the narrow beamwidth is also seen as an advantage for isolating two 60 GHz lengths in the same room that would not see interference from each other, unlike the lower frequency bands. The size of the antenna is also seen as an advantage for miniaturization, even if multiple transceivers are placed close together.

Figure 1:
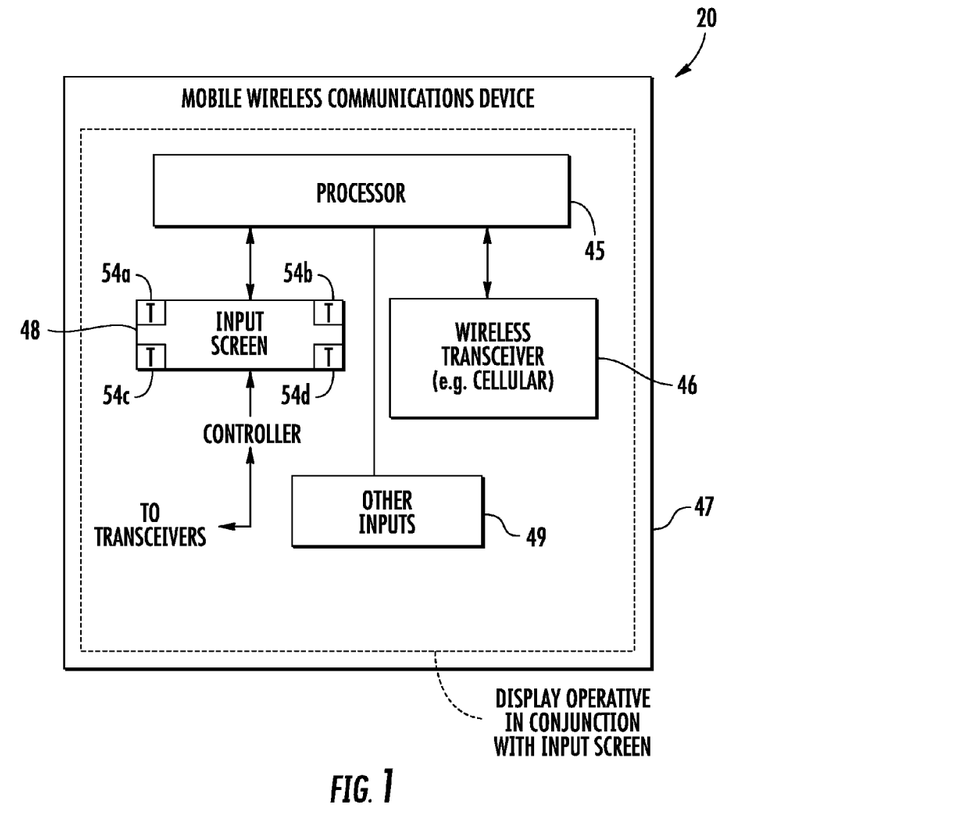
FIG. 1 is a high-level schematic circuit block diagram of an example embodiment of a mobile wireless communications device that includes an input screen in accordance with a non-limiting embodiment.

Referring now to FIG. 1, a mobile wireless communications device 20 is now described and illustratively includes a housing 47 and an input screen 48 typically carried by the front of the housing and extending over the front in a substantially rectangular configuration. In a preferred example, it is a display. A wireless transceiver 46 is carried by the housing and a processor 45 is carried by the housing and coupled to the wireless transceiver (e.g., a cellular transceiver). Other inputs 49 are illustrated as non-limiting examples.

Figure 2:
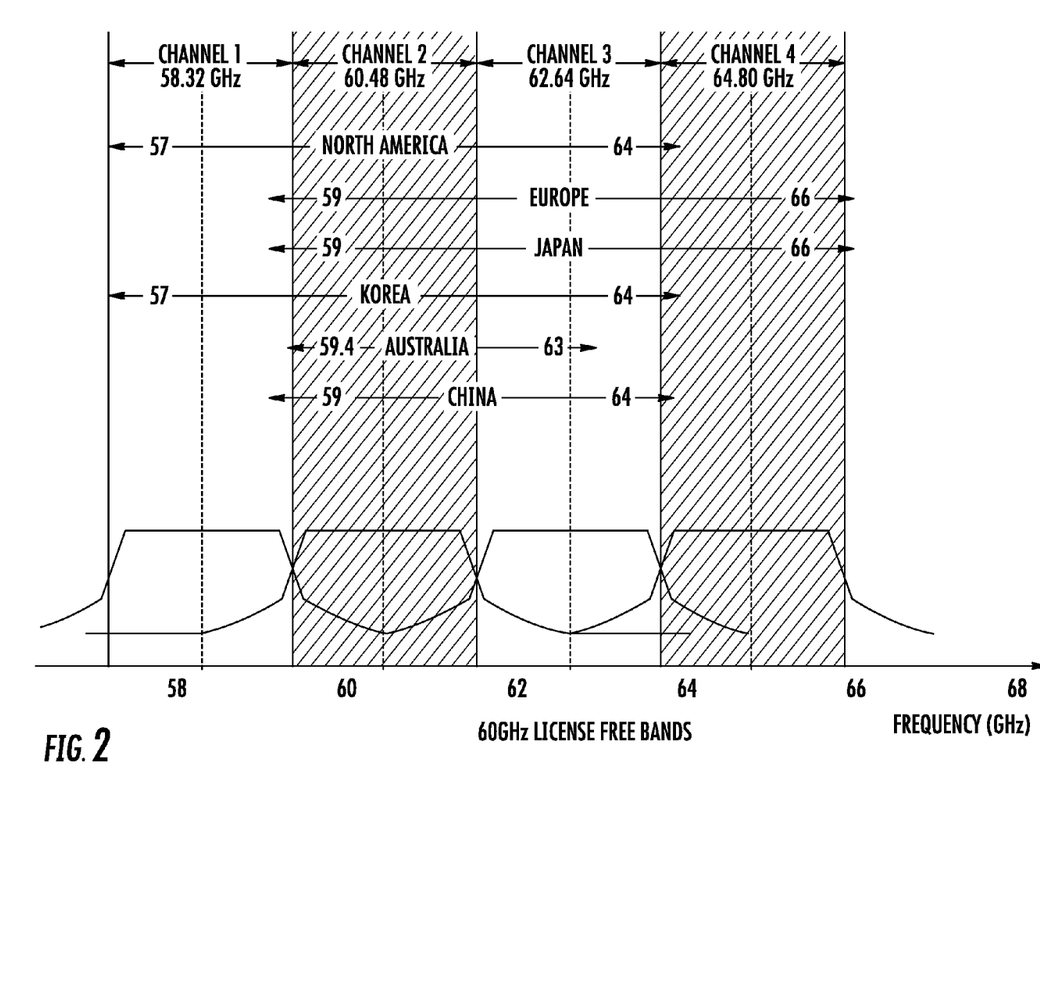
FIG. 2 is a graph showing the license free bands at about 60 GHz.

The communications device preferably operates in the unlicensed band of the 60 GHz band and generally deemed appropriate for ultra high-speed short range wireless communication. At present, several commercial vendors have provided transceiver ICs with I/Q interfaces and supporting beam-forming in the analog domain with coarse stepping. FIG. 2 illustrates various 60 GHz license free bands and shows four channel ranges.

The earliest commercial use of 60 GHz band was seen as wireless video transfer from an access point to a high-definition TV. This resulted in WirelessHD (803.15.3c) standard which was primarily developed by SiBeam, a startup company in California that has recently been acquired by Silicon Image. An independent activity resulting in ECMA-387 standard was independently developed and added a support for HDMI PAL. This standard was pushed by Georgia Institute of Technology.

Wider WLAN related standard activities noticed the new 60 GHz opportunity and sought to use this band for ultra-high speed links that could take advantage of the wide bandwidth available in this license free band. The first step was to introduce the physical layer for 60 GHz. The higher level layers were kept the same as an initial starting point. Subsequently, beam-steering was added to the layers above. These activities culminated in 802.11ad standard that would be deployed after 802.11ac that operates in 5 GHz band using MIMO techniques. This standard is also shared by WiGig Alliance that adds PALS of its own on top of the 802.11ad standard for modes such as HDMI data transfer.

In contrast to 5 GHz band based 802.11ac, the 60 GHz band based 802.11ad inherits the physical properties of 60 GHz band which limits practical link lengths to less than 10 m. However, much higher throughputs are achievable by using the available much wider bandwidth.

Figure 3:
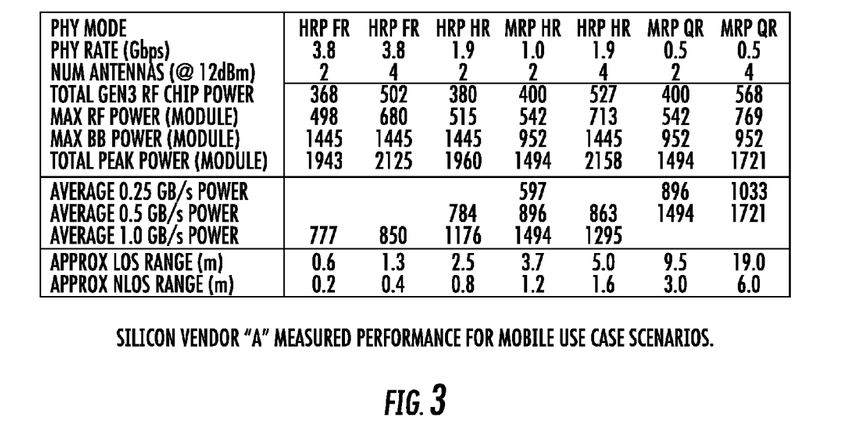
FIG. 3 is a summary of the measured performance for mobile use case scenarios for 60 GHz links.

Several companies have demonstrated 60 GHz wireless links, which have been developed primarily for video distribution in a room and use advance beam-forming techniques to combat shadowing due to people passing through the wireless 60 GHz link. To accommodate the advance beam forming, up to 12 PAs and LNAs have been provided. One available chip operates with 12, 8 or 4 PA/LNA combinations, consuming 2.8 W, 2.2 W and 0.4 W in these modes of operation. An equal amount of power is consumed in the digital baseband. Due to limited commercial success, companies are looking to reduce power consumption and target the mobile tablet based market. FIG. 3 is a table showing a summary of measured performance for mobile use case scenarios.

An advantage of using 60 GHz band is the availability of wideband and the low energy/bit of data transfer. As an example, Bluetooth, 802.11n and the Gen4 provide roughly 21.8 nJ/bit, 5 nJ/bit and 0.3 nJ//bit for data transfer. For short range communication, use cases that do not require advance beam forming with larger array (>4 elements), 60 GHz band provides a low power alternative, even for transferring a less than GB of data.

Several other companies have also taken up development of 60 GHz wireless communication solutions and have demonstrated 60 GHz wireless links. Wireless LAN 802.11ac is a natural evolution of WLAN technology and can provide close to 500 Mbps communication that is sufficient for lightly compressed HD video. Being in 5 GHz band, there are no issues of range and no shadowing related problems. One reason to move to 60 GHz short range wireless links would be to counter spectral over-crowding, since the directivity of 60 GHz beam could be taken advantage of to solve the problem of spectral clutter.

60 GHz frequency band sees the first use for applications that are defined in 2.4 GHz and 5 GHz bands. The physics of 60 GHz are different from the physics of lower frequency bands. First it has a narrower beam; second, it attenuates faster and has a shorter range due to more wavelengths traversing the same distance. While seen as clear disadvantages of going to higher frequencies, the narrow beam width is also seen as an advantage for isolating two 60 GHz links in the same room that will not see interference from each other, unlike the lower frequency bands. The size of the antenna is also seen as an advantage for miniaturization, even if multiple transceivers are placed closer together.

Figure 4:
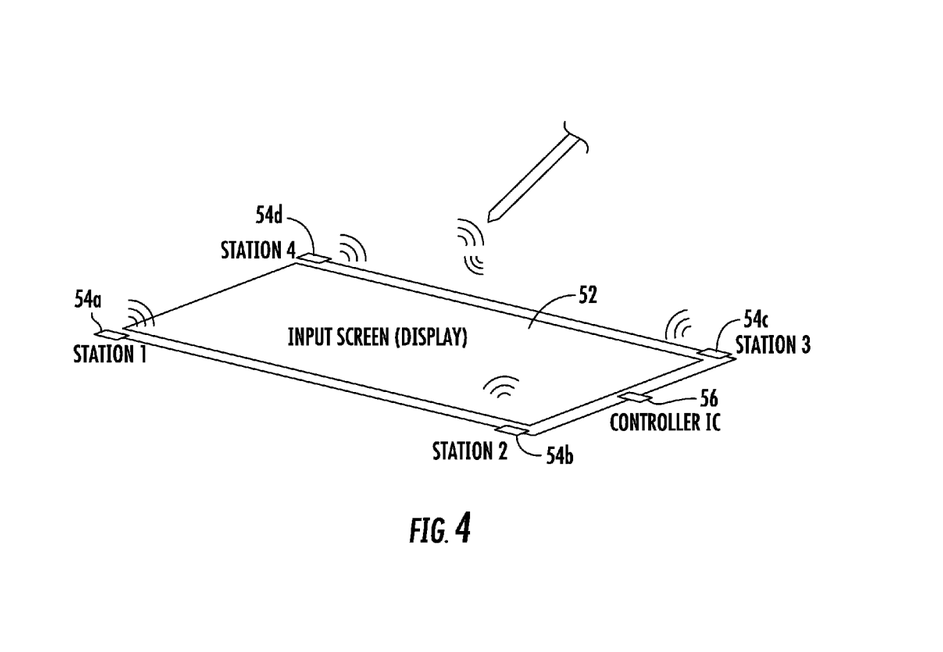
FIG. 4 is a high-level isometric view of an input screen corresponding to a three-dimensional keyboard and showing several transceivers positioned around the input screen in which the location of the object or reflector is determined from the reflected signals in accordance with a non-limiting example.

The short wavelength of 60 GHz frequency and limited range offers the possibility of using this frequency band for other applications such as developing a 3D keyboard 50 as shown in FIG. 4. The input screen 52 is shown in FIG. 4 as a rectangular configured input screen that could be positioned at the front panel of a mobile wireless communications device (not shown). Four spaced transceivers 54 are shown positioned at each corner of the rectangular configured input screen and connected to the processor 56, which in this embodiment is shown as a controller IC and which corresponds to the processor shown in FIG. 1.

As shown in FIG. 4, transceivers 54a-d are placed around the input screen 52 and are controlled by the processor 56. Three transceivers may be enough. The input screen 52 is described using a four transceiver solution. Each transceiver includes an oscillator that drives an embedded antenna inside the IC to reduce cost, while compromising range. Small external antennae may be used to extend the range for a tablet application but it may be unnecessary for a mobile hand set.

In essence, this is an inverse GPS problem, whereby the location of reflector(s) is(are) determined by processing the reflected signal. The complexity of the system can be reduced by using frequency- modulated continuous wave (FMCW) radar principles in which the oscillator sweeps the output frequency and the reflected wave is received at a frequency lag, hence producing an IF frequency signal. The offset of the IF frequency represents the distance of the reflector while the strength of the received signal depends on the reflectivity (dielectric constant) of the reflector.

As illustrated, the input screen 52 operates as a display and is rectangular configured as typical of many displays carried by a portable wireless communications device. Each corner of the rectangular configured display as the input screen includes the spaced transceiver 54 that is connected to the processor 56 that includes digital signal processing capabilities. As explained below, each transceiver includes an oscillator that is connected to a Schottky diode and antenna. The Schottky diode connects to a digital/analog converter and the processor while the oscillator connects to an analog/digital converter.

Figure 5:
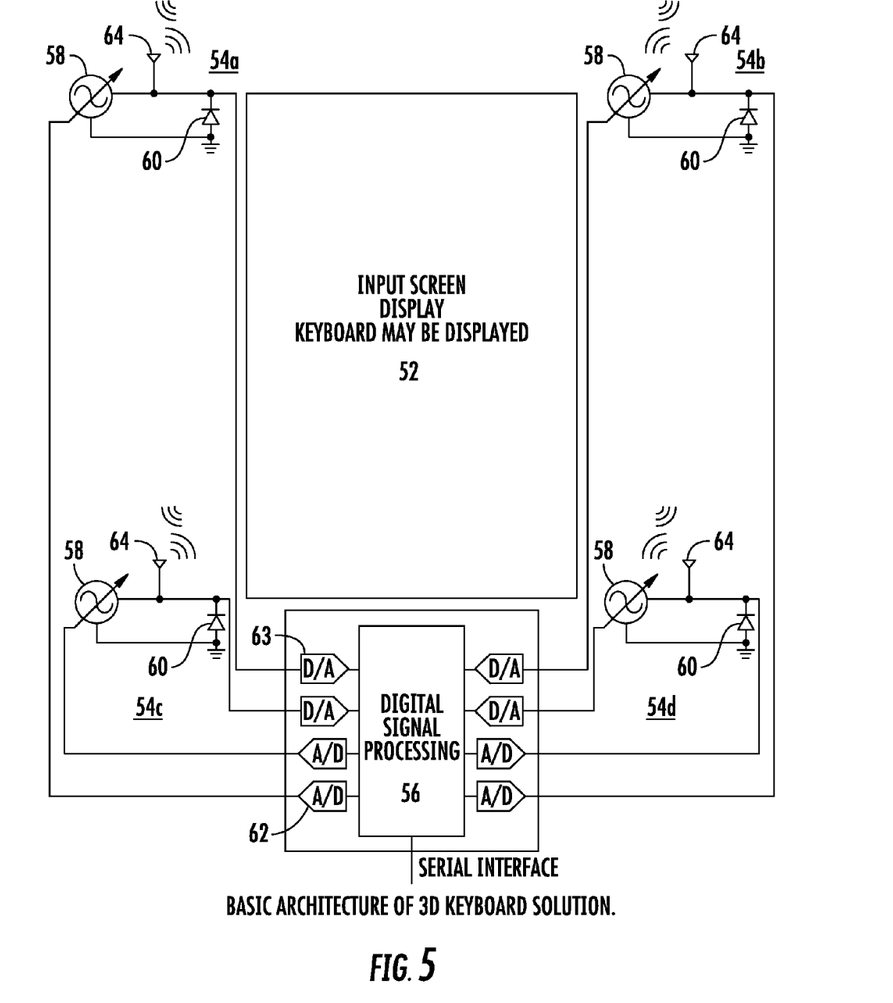
FIG. 5 is a block diagram showing a basic circuit architecture for the three-dimensional keyboard solution in accordance with a non-limiting example.

The circuit for a 3D keyboard is shown in further detail in FIG. 5. The input screen 52 is illustrated and each transceiver 52a-d includes an oscillator 58 and a Schottky diode 60 that down-converts the reflected signal from the nearby object using the transmitted signal as the local oscillator (LO). The controller IC as a processor 56 provides the ramping signals to the four transceivers and the A/D 62 converts the down-converted signals that represent distance of the reflector as the object as an IF frequency. The D/A 63 is also shown. The oscillator 58 directly drives the antenna 64. The non-linearity in the diode down-converts the reflected signal by mixing it with the LO. There can be other implementations, however, the illustrated design is most area efficient and lowest in power consumption. The controller as a processor 56 drives the oscillator frequencies of different stations, computes the 3D location of the reflector(s) and provides it to the host application processor through serial interface. It should be understood the term processor means one or more processors and controllers in this description.

Building a 60 GHz oscillator with several hundred MHz of tuning range is quite reasonable, since many companies have demonstrated several GHz wide tuning range. The received signal down converted using the Schottky diode uses the current transmitted output signal (which is ramped) as the LO and mixes down the reflected signal (which is an older frequency) to an IF frequency that is fed out to the Controller IC as the processor. The controller IC determines the location by processing the IF signals from the four transceivers.

The circuit can be implemented with a platform such as ARS FPGA since the controller IC functions can be developed in hardware and tested for performance. Key elements in the development of such a system are the antenna constructs that allow wider beams covering short range and the controller IC. The stations do not need to be constantly powered. They can be activated periodically to scan the space. The period can be reduced when high activity is determined. The resolution is enhanced due to FMCW based device operation.

Although this application can create a new input device that can interact with a user in completely new ways, it does not require a very complex transceiver. It only requires an oscillator and a diode detector that has been demonstrated to work at 300 GHz in 45 nm CMOS process.

60 GHz frequency is high enough to allow implementation of small transceivers. Using 120 GHz is also a possibility as it is also unlicensed band and offers even smaller integrated antennas, albeit narrower beamwidth. However, 60 GHz is more mature and 40 nm CMOS can produce quite decent output power at this frequency.

It should be understood that the frequency modulated continuous-wave radar is used for spatial resolution in which the roundtrip delay translates to an IF frequency. This is an inverse GPS problem in which location is determined by collecting information from "satellites," i.e., the object to be detected, such as a stylus. A very low power design is possible to compete with passive 2D technology. 60 GHz is advantageous within the ISM band because it attenuates quickly and reflections from walls do not create large signals and a small antenna is possible. It is a low power design for power consumption in the oscillator, analog-to-digital converter and the digital signal processor (DSP) that could be part of the regular processor or separate.

Figure 6:
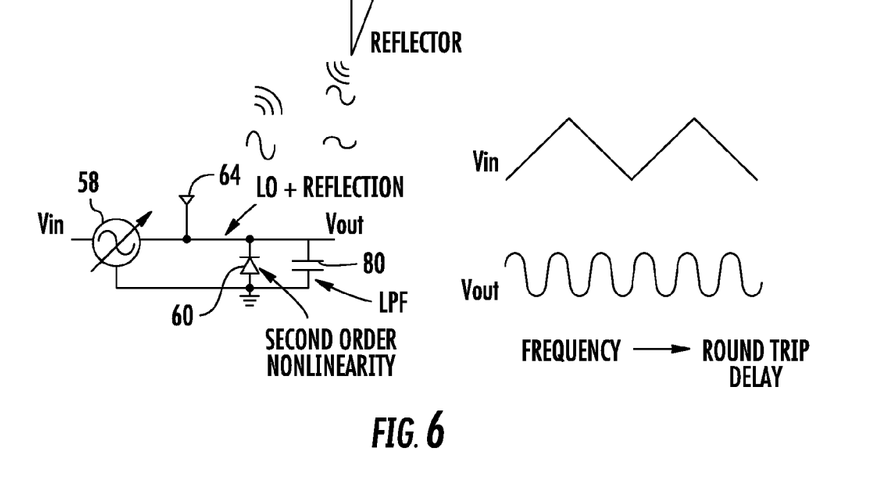
FIG. 6 is another view of the transceiver that includes an oscillator with second order non-linearity and showing the signal input and output configuration.

FIG. 6 illustrates the transceiver such as shown in FIG. 5 and showing the second order non-linearity and the use of the low pass filter as a capacitor 80 with the voltage representation $V_{IN}$ as the sawtooth and the voltage out $V_{out}$ as the sine wave. Frequency is closely related with the roundtrip delay.

Figure 7:
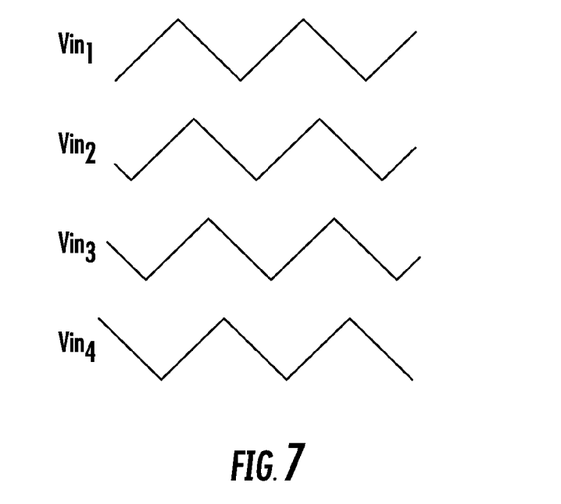
FIG. 7 is a graph of multiple signals showing the configuration of the multi-phased ramp signals used to eliminate crosstalk in accordance with a non-limiting example.

As shown in FIG. 7, multiple reflections operate with the multi-phase ramp signals that eliminate crosstalk and are eliminated by the low pass filter for the different voltage representations as shown in FIG. 7. A second approach could be turning one transmitter on at a time in quick succession.

Figure 8:
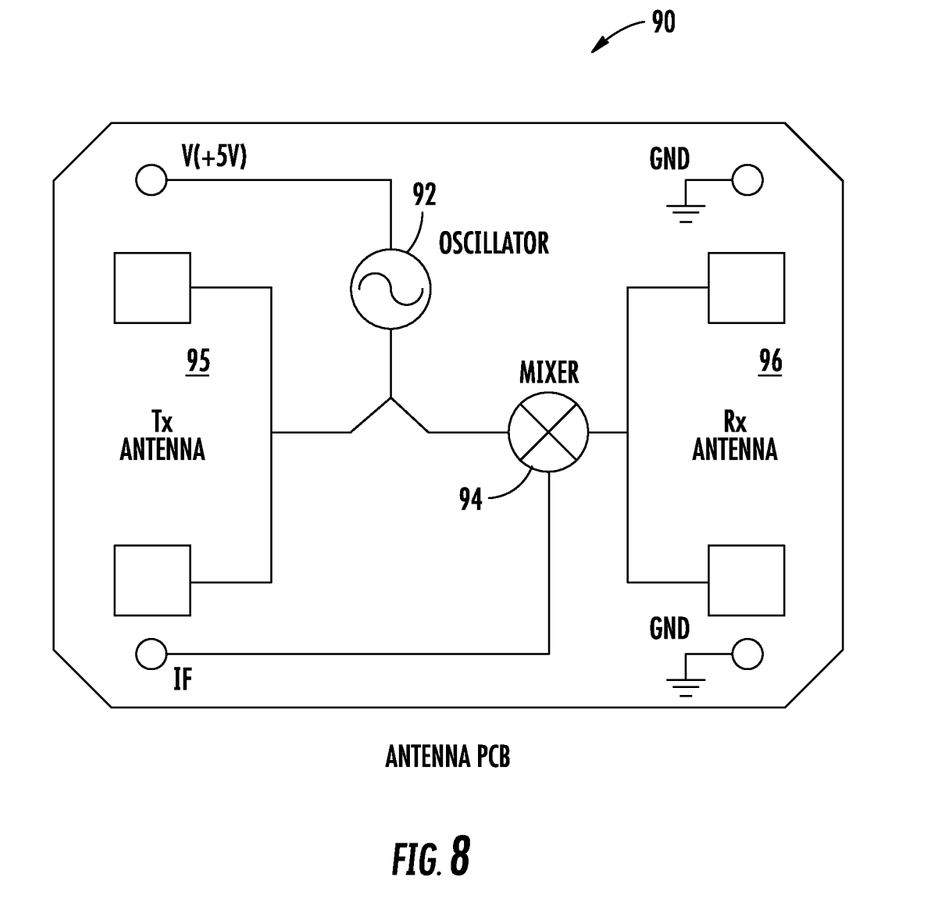
FIG. 8 is a block diagram of an example antenna circuit that could be used with the transceiver in accordance with a non-limiting example.

FIG. 8 is a view of an antenna printed circuit board 90 and showing an oscillator 92 and mixer 94 with the transmit antenna 95 and receiver antenna 96. The intermediate frequency is input into the mixer 94. The device was operated at an operation frequency of 10.525 GHz in a test.

As the inverse GPS problem, the intermediate frequency is translated to the distance of the reflector from the transmitter. Typically, four equations are obtained and the x, y, z coordinates are determined for a position that can be reported to various software applications running with the processor in the communications device. The duty cycle can be used to reduce the power dissipation of the active keyboard.

It should be understood that the frequency modulated continuous-wave radar is a short range measuring radar set that usually is modulated by a triangular modulated signal that varies gradually and mixes with a signal reflected from the target object and with the transmit signal to produce the beat signal. There are modulation variations, but the triangle modulation is typically used where both range and velocity are desired. Digital signal processing is used for detection processing and beat signals are passed through the analog-to-digital converter and digital processor performed. It should be understood that different calculations can be used including Bancroft's method, transliteration, multi-dimensional Newton-Raphson calculations and other techniques.

Figure 9:
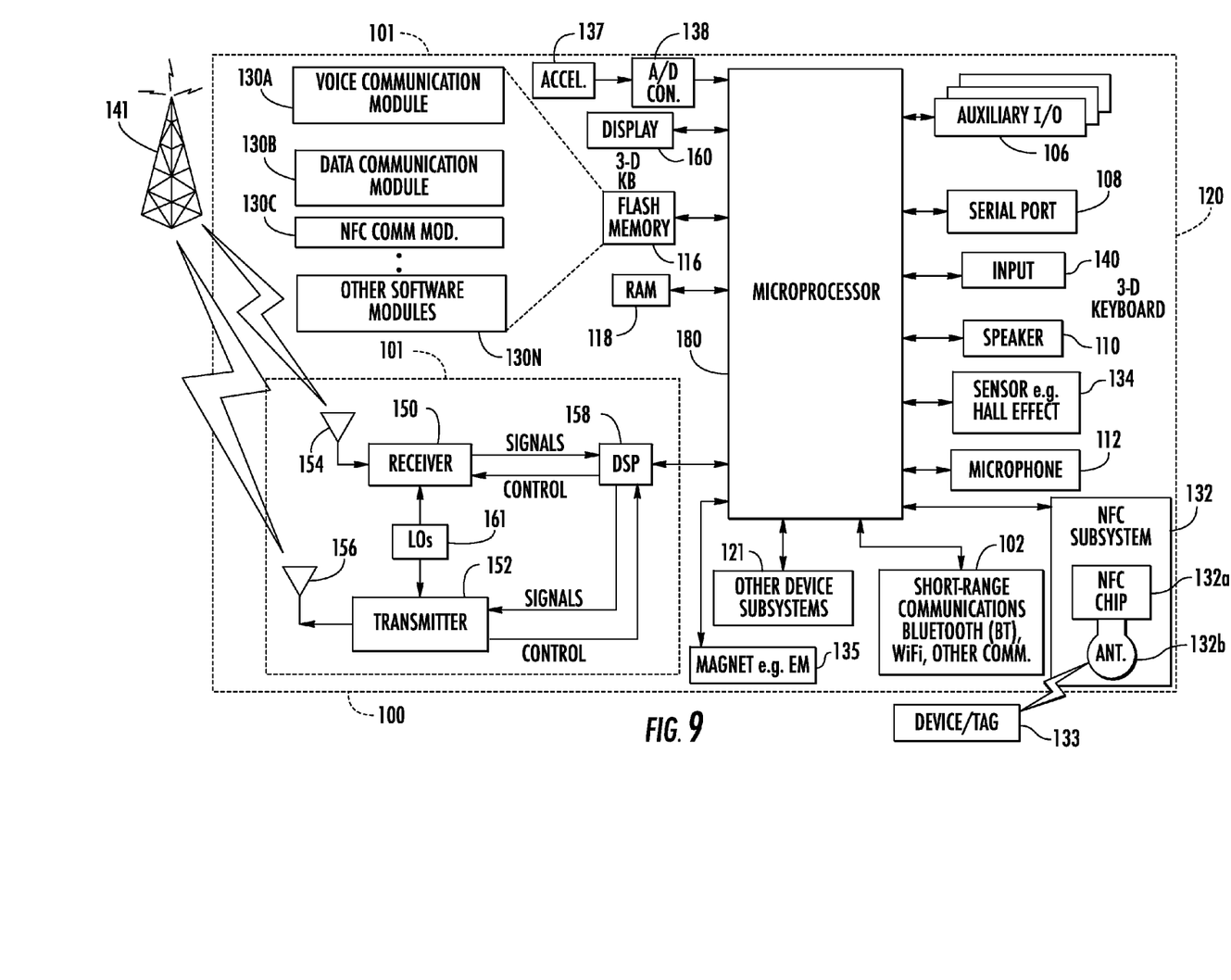
FIG. 9 is a high-level block diagram showing basic components of a mobile wireless communications device that can incorporate the functionality of the input screen and use location determination in accordance with a non-limiting example.

A non-limiting example of various functional components that can be used in the exemplary mobile wireless communications device 20 is further described in the example below with reference to FIG. 9. New reference numerals are used. Device 100 is an example embodiment of the device 20. The device 100 illustratively includes a housing 120, an input 140 and an output device 160. The input 140 could be circuitry connected to a touch sensitive input such as a display and/or a separate input, including a keyboard. The input could be the input screen as a display with the transceivers as described above. The output device 160 shown is a display, which could be a full graphic LCD and operate as a 3D keyboard in conjunction with the input 140 as transceivers. Other types of output devices may alternatively be used. A processing device 180 is contained within the housing 120 and is coupled between the input 140 and the display 160. This device 180 is typically a microprocessor chip contained on a circuit board in the housing 120. When the display operates as described above, any keypad is not necessary and there is the 3D keyboard. The processing device 180 controls the operation of the display 160, as well as the overall operation of the mobile device 100, in response to input by the user.

The housing 120 may be elongated vertically, or may take on other sizes and shapes (including clamshell housing structures). If a keypad is used in addition to a touch screen display, the keypad may include a mode selection key, or the device may include other hardware or software for switching between text entry and telephony entry. The device could include those devices and a separate input screen operative as a 3D keyboard.

In addition to the processing device 180, other parts of the mobile device 100 are shown schematically in FIG. 1. These include a communications subsystem 101; a short-range communications subsystem 102; the input 140 and the display 160, along with other input/output devices 106, 108, 110 and 112; as well as memory devices 116, 118 and various other device subsystems 121. The mobile device 100 is in this example a two-way RF communications device having voice and data communications capabilities using RF circuitry. In addition, the mobile device 100 has the capability to communicate with other computer systems via the Internet. The short-range communications subsystem 102 includes a Bluetooth (BT) communications module for establishing a Bluetooth wireless connection and other communications modules such as an infrared module or device, WiFi circuit and module, and associated components and circuits as part of RF circuitry.

Operating system software executed by the processing device 180 may be stored in a persistent store, such as the flash memory 116, or may be stored in other types of memory devices, such as a read only memory (ROM) or similar storage element. In addition, system software, specific device applications, or parts thereof, may be temporarily loaded into a volatile store, such as the random access memory (RAM) 118. Communications signals received by the mobile device may also be stored in the RAM 118.

The processing device 180, in addition to its operating system functions, enables execution of software applications 130a-130n on the device 100. A predetermined set of applications that control basic device operations, such as data and voice communications 130a and 130b, may be installed on the device 100 during manufacture. A Near Field Communications module 130C may also installed as illustrated.

The NFC communications module 130c as a software module cooperates with the microprocessor 180 through the flash memory 116. The microprocessor 180 operates also with the NFC subsystem 132 that includes a NFC chip 132a and antenna 132b that in the example above is integrated with the display that could communicate with another device/tag 133 in a non-limiting example. The NFC communications module 130c allows the microprocessor to control the NFC subsystem 132, which includes the NFC chip 132a and antenna 132b that is tuned typically for 13.56 MHz. The NFC chip 132a could be, for example, a PN531 microcontroller-based transmission module from the Phillips Semiconductor Branch of Koninklijke Phillips Electronics N.V. When the NFC chip is a PN531 module, the NFC chip 132a could include analog circuitry and a contact list Universal Asynchronous Receiver Transmitter (UART), a core and a set of host interfaces. The analog circuitry could include an output driver, an integrated demodulator, a bit decoder, a mode detector and an RF-level detector. The contact list UART could include elements for data processing, Cyclical Redundancy Checking (CFC), parity generation, framing generation and check bit coding and decoding. The core typically includes an 80C51 microcontroller, 32 Kbyte of ROM and one Kbyte of RAM. A set of host interfaces can interface with the microprocessor and interface according to such known standards as I2C, serial UART, SPI and USB.

There is also illustrated a magnetic sensor 134 that could be formed as a Hall Effect sensor and is connected to the microprocessor 180. It includes the various components that operate as a Hall Effect sensor, including any necessary coils or other circuits. There is also illustrated a magnet 135 that, in one example, is formed as an electromagnet and operates with the microprocessor to allow a different communications pathway using electromagnetic energy that is changed to correspond to changing data. This electromagnet 135 has different functions, including working as an active or passive device in association with other components of the device 100 as illustrated. For example, when the electromagnet 135 is used in place of an installed magnet (non-electromagnetic) in the device, a pulse of energy could be delivered to the Hall Effect sensor in another device. The other device receives the pulse and establishes a Bluetooth connection without going through activation of the NFC circuit. A WiFi connection, for example, in the alternative is established if a Bluetooth connection is not established. Other software modules 130n include software that interoperates with the magnetic sensor 134 and any magnet or electromagnet 135 or other magnetic circuitry that are included within the overall electromagnet 135.

An accelerometer 137 and an analog/digital converter 138 could be connected to the microprocessor 180 as illustrated and allow another implementation of an NFC automatic tag detection (and automatic peer-to-peer detection). The accelerometer 137 could recognize the tapping of a communications device against a tag or another device, i.e., recognizes the vibrations. Instead of using the Hall effect sensors and magnets to wake up the NFC circuit, the circuit uses tap recognition, for example, as a vibration sensor and accelerometer in this example. It should be understood that when the device is tapped against another object, for example, an NFC tag, a profile is generated as a matter of certain accelerometer parameters being met or exceeded. If the profile is compared against a known tap profile, it will wake the NFC circuit and initiate communication. In other embodiments, the accelerometer could be part of a motion sensor system and other motion sensor systems other than an accelerometer could be used such as a cadence sensor or cadence detection system.

As will be appreciated by persons skilled in the art, an accelerometer is a sensor which converts acceleration from motion (e.g., movement of the communications device or a portion thereof due to the strike force) and gravity which are detected by a sensing element into an electrical signal (producing a corresponding change in output) and is available in one, two or three axis configurations. Accelerometers may produce digital or analog output signals depending on the type of accelerometer. Generally, two types of outputs are available depending on whether an analog or digital accelerometer is used: (1) an analog output requiring buffering and analog-to-digital (A/D) conversion; and (2) a digital output which is typically available in an industry standard interface such as an SPI (Serial Peripheral Interface) or I2C (Inter-Integrated Circuit) interface. The embodiment shown in FIG. 9 illustrates an analog output into the A/D converter 138. The output of an accelerometer is typically measured in terms of the gravitational acceleration constant at the Earth's surface, denoted g, which is approximately 9.81 m/s$^2$ (32.2 ft/s$^2$) as the standard average. The accelerometer may be of almost any type including, but not limited to, a capacitive, piezoelectric, piezoresistive, or gas-based accelerometer. The range of accelerometers varies up to the thousands of g's, however for portable electronic devices "low-g" accelerometers may be used. Example low-g accelerometers which may be used are MEMS digital accelerometers from Analog Devices, Inc. (ADI), Freescale Semiconductor, Inc. (Freescale) and STMicroelectronics N.V. of Geneva, Switzerland.

The operational settings of the accelerometer, in one example, are controlled using control signals sent to the accelerometer via a serial interface. In one illustrated example, the microprocessor determines the motion detection in accordance with the acceleration measured by the accelerometer. Raw acceleration data measured by the accelerometer, in another example, is sent to the microprocessor via a serial interface where motion detection is determined by the operating system or other software module. In other embodiments, a different digital accelerometer configuration could be used, or a suitable analog accelerometer and control circuit could be used.

In addition, a personal information manager (PIM) application may be installed during manufacture. The PIM is capable of organizing and managing data items, such as email, calendar events, voice mails, appointments, and task items. The PIM application is also capable of sending and receiving data items via a wireless network 141. The PIM data items are seamlessly integrated, synchronized and updated via the wireless network 141 with the device user's corresponding data items stored or associated with a host computer system.

Communication functions, including data and voice communications, are performed through the communications subsystem 101, and possibly through the short-range communications subsystem 120, which are part of RF circuitry contained on a circuit board typically as shown by the outline. The communications subsystem 101 includes a receiver 150, a transmitter 152, and one or more antennae 154 and 156. In addition, the communications subsystem 101 also includes a processing module, such as a digital signal processor (DSP) 158, and local oscillators (LOs) 161 as part of RF circuitry in this example. The specific design and implementation of the communications subsystem 101 is dependent upon the communications network in which the mobile device 100 is intended to operate. For example, the mobile device 100 may include a communications subsystem 101 designed to operate with the Mobitex™, Data TAC™ or General Packet Radio Service (GPRS) mobile data communications networks, and also designed to operate with any of a variety of voice communications networks, such as AMPS, TDMA, CDMA, PCS, GSM, etc. Other types of data and voice networks, both separate and integrated, may also be used with the mobile device 100.

Network access requirements vary depending upon the type of communication system. For example, in the Mobitex and DataTAC networks, mobile devices are registered on the network using a unique personal identification number or PIN associated with each device. In GPRS networks, however, network access is associated with a subscriber or user of a device. A GPRS device therefore typically utilizes a subscriber identity module, commonly referred to as a SIM card, in order to operate on a GPRS network.

When required network registration or activation procedures have been completed, the mobile device 100 sends and receives communications signals over the communication network 141. Signals received from the communications network 141 by the antenna 154 are routed to the receiver 150, which provides for signal amplification, frequency down conversion, filtering, channel selection, etc., and may also provide analog to digital conversion. Analog-to-digital conversion of the received signal allows the DSP 158 to perform more complex communications functions, such as demodulation and decoding. In a similar manner, signals to be transmitted to the network 141 are processed (e.g., modulated and encoded) by the DSP 158 and are then provided to the transmitter 152 for digital to analog conversion, frequency up conversion, filtering, amplification and transmission to the communication network 141 (or networks) via the antenna 156.

In addition to processing communications signals, the DSP 158 provides for control of the receiver 150 and the transmitter 152. For example, gains applied to communications signals in the receiver 150 and transmitter 152 may be adaptively controlled through automatic gain control algorithms implemented in the DSP 158.

In a data communications mode, a received signal, such as a text message or web page download, is processed by the communications subsystem 101 and is input to the processing device 180. The received signal is then further processed by the processing device 180 for an output to the display 160, or alternatively to some other auxiliary I/O device 106. A device user may also compose data items, such as e-mail messages, using the input 140 and/or some other auxiliary I/O device 106, such as a touchpad, a trackball, a trackpad, a rocker switch, a thumb-wheel, or some other type of input device. The composed data items may then be transmitted over the communications network 141 via the communications subsystem 101.

In a voice communications mode, overall operation of the device is substantially similar to the data communications mode, except that received signals are output to a speaker 110, and signals for transmission are generated by a microphone 112. Alternative voice or audio I/O subsystems, such as a voice message recording subsystem, may also be implemented on the device 100. In addition, the display 160 may also be used in voice communications mode, for example to display the identity of a calling party, the duration of a voice call, or other voice call related information and whether there are NFC communications or a Bluetooth connection.

Any short-range communications subsystem enables communication between the mobile device 100 and other proximate systems or devices, which need not necessarily be similar devices. For example, the short-range communications subsystem may include an infrared device and associated circuits and components as described above, or a Bluetooth communications module to provide for communication with similarly-enabled systems and devices as well as the NFC communications.

In accordance with various embodiments, GSM is an exemplary communications system and uses a radio interface that can have an uplink frequency band and downlink frequency band with about 25 MHz bandwidth, typically subdivided into 124 carrier frequency channels, each spaced about 200 KHz apart as non-limiting examples. Time division multiplexing is usually used to allow about 8 speech channels per radio frequency channel, giving 8 radio time slots and 8 burst periods grouped into what is called a TDMA frame. For example, a channel data rate is typically about 270.833 Kbps and a frame duration of about 4.615 milliseconds (MS) in one non-limiting example. The power output usually varies from about 1 to about 2 watts.

Typically, linear predictive coding (LPC) is used to reduce the bit rate and provide parameters for a filter to mimic a vocal track with speech encoded at about 13 Kbps. Four different cell sizes are typically used in a GSM network, including macro, micro, pico and umbrella cells. A base station antenna is typically installed on a master building above the average rooftop level in a macrocell. In a microcell, the antenna height is typically under the average rooftop level and used in urban areas. Microcells typically have a diameter of about a few dozen meters and are used indoors. Umbrella cells usually cover shadowed regions or smaller cells. Typically, the longest distance for the GSM specification covered by an antenna is about 22 miles depending on antenna height, gain and propagation conditions.

GSM systems typically include a base station subsystem, a network and switching subsystem, and a General Packet Radio Service (GPRS) core network. A subscriber identity module (SIM) is usually implemented in the communications device, for example, the well-known SIM card, similar to a smart card containing the subscription information and phone book of a user. The user typically switches handsets or could change operators by changing a SIM. USIM, RUIM or CSIM and other similar technologies can be used in UMTS or CDMA networks.

The GSM signaling protocol has three general layers. Layer 1 is a physical layer using channel structures above the air interface. Layer 2 is the data link layer. Layer 3 is a signaling protocol, which includes three sublayers. These include a Radio Resources Management sublayer to control the setup, maintenance and termination of radio and fixed channels, including handovers. A Mobility Management sublayer manages the location updating and registration procedures and secures the authentication. A Connection Management sublayer handles general call control and manages supplementary services and the short message service. Signaling between different entities such as the Home Location Register (HLR) and Visiting Location Register (VLR) can be accomplished through a Mobile Application Part (MAP) built upon the Transaction Capabilities Application Part (TCAP) of the top layer of the Signaling System No. 7.

A Radio Resources Management (RRM) sublayer typically oversees the radio and fixed link establishment between the mobile station and an MSE.

It is also possible to used Enhanced Data Rates for GSM Evolution (EDGE), as an enhancement to General Packet Radio Service (GPRS) networks. EDGE typically uses 8 Phase Shift Keying (8 PSK) and Gaussian Minimum Shift Keying (GMSK) for different modulation and coding schemes. A three-bit word is usually produced for every changing carrier phase. A rate adaptation algorithm typically adapts the Modulation and Coding Scheme (MCS) according to the quality of the radio channel and the bit rate and robustness of data transmission. Base stations are typically modified for EDGE use.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A communications device, comprising:
a housing;
a wireless transceiver and processor carried by the housing and operative with each other;
an input screen carried by the housing and comprising a plurality of spaced transceivers positioned at the input screen and connected to the processor and each configured to transmit a millimeter wave RF signal and receive reflected signals from an object positioned close to the input screen;
wherein said processor is configured to determine the location of the object relative to the input screen based on the reflected signals received at each transceiver.

2. The communications device according to claim 1, wherein said input screen comprises a display and further comprising an application program operating within the processor to which the location of the object is used by the application program as an input.

3. The communications device according to claim 2, wherein said application program is operative to function as a keyboard displayed on the input screen wherein the location of the object relative to the keyboard displayed on the screen is an input for a typed keyboard entry.

4. The communications device according to claim 1, wherein each transceiver is configured to transmit about a 60 GHz RF signal within a several hundred MHz tuning range.

5. The communications device according to claim 4, wherein each transmitted RF signal comprises a frequency modulated continuous-wave radar signal.

6. The communications device according to claim 4, wherein each transceiver is configured to transmit the RF signal at a different frequency and detected intermediate frequencies (IF) are processed to determine the object's location.

7. The communications device according to claim 1, wherein said RF signals from said transceivers comprise multi-phased ramp signals.

8. The communications device according to claim 1, and further comprising a substantially rectangular configured input screen, wherein a transceiver is spaced at each corner of the rectangular configured input screen.

9. The communications device according to claim 1, and further comprising an embedded antenna at each transceiver.

10. A communications device, comprising:
a housing;
a wireless transceiver and processor carried by the housing and operative with each other;
an input screen carried by the housing and comprising a plurality of spaced transceivers positioned at the input screen and connected to the processor wherein each transceiver is configured to transmit a millimeter wave RF signal and receive reflected signals from an object positioned close to the input screen, each transceiver comprising an oscillator and embedded antenna wherein the oscillator is configured to sweep an output frequency and reflected signals are received at a frequency lag producing an intermediate frequency (IF) signal;

wherein said processor is configured to determine the location of the object relative to the input screen based on the reflected signals received at each transceiver and the offset of the IF frequency represents the distance of the object that reflects the signals.

11. The communications device according to claim 10, wherein the strength of the received signal depends on the reflectivity as the dielectric constant of the object that reflects the signals.

12. The communications device according to claim 10, wherein each transceiver further comprises a diode connected to said oscillator and operative together to down-convert the received signals using the transmitted signal as the local oscillator.

13. The communications device according to claim 10, wherein said input screen comprises a display and further comprising an application program operating within the processor to which the location of the object is used by the application program as an input.

14. The communications device according to claim 13, wherein said application program is operative to function as a keyboard displayed on the input screen wherein the location of the object relative to the keyboard displayed on the screen as an input for a typed keyboard entry.

15. The communications device according to claim 10, wherein each transceiver is configured to transmit about a 60 GHz RF signal within a several hundred MHz tuning range.

16. The communications device according to claim 15, wherein each transmitted RF signal comprises a frequency modulated continuous-wave radar signal.

17. The communications device according to claim 15, wherein each transceiver is configured to transmit the RF signal at a different frequency and detected intermediate frequencies (IF) are processed to determine the object's location.

18. The communications device according to claim 10, wherein said RF signals from said transceivers comprise multi-phased ramp signals.

19. The communications device according to claim 10, and further comprising a substantially rectangular configured input screen, wherein a transceiver is spaced at each corner of the rectangular configured input screen.

20. A method of making a communications device, comprising:

providing a housing, a wireless transceiver and processor operative with each other and an input screen carried by the housing and comprising a plurality of spaced transceivers positioned at the input screen and connected to the processor;

wherein each spaced transceiver is configured to transmit a millimeter wave RF signal and receive reflected signals from an object positioned close to the input screen and said processor is configured to determine the location of the object relative to the input screen based on the reflected signals received at each transceiver.

21. The method according to claim 20, wherein said input screen comprises a display and further comprising loading an application program within the processor to which the location of the object is used by the application program as an input.

* * * * *